Jan. 9, 1940. G. S. PERRY 2,186,654
TREE SCARRING DEVICE
Filed Oct. 28, 1938 3 Sheets-Sheet 1
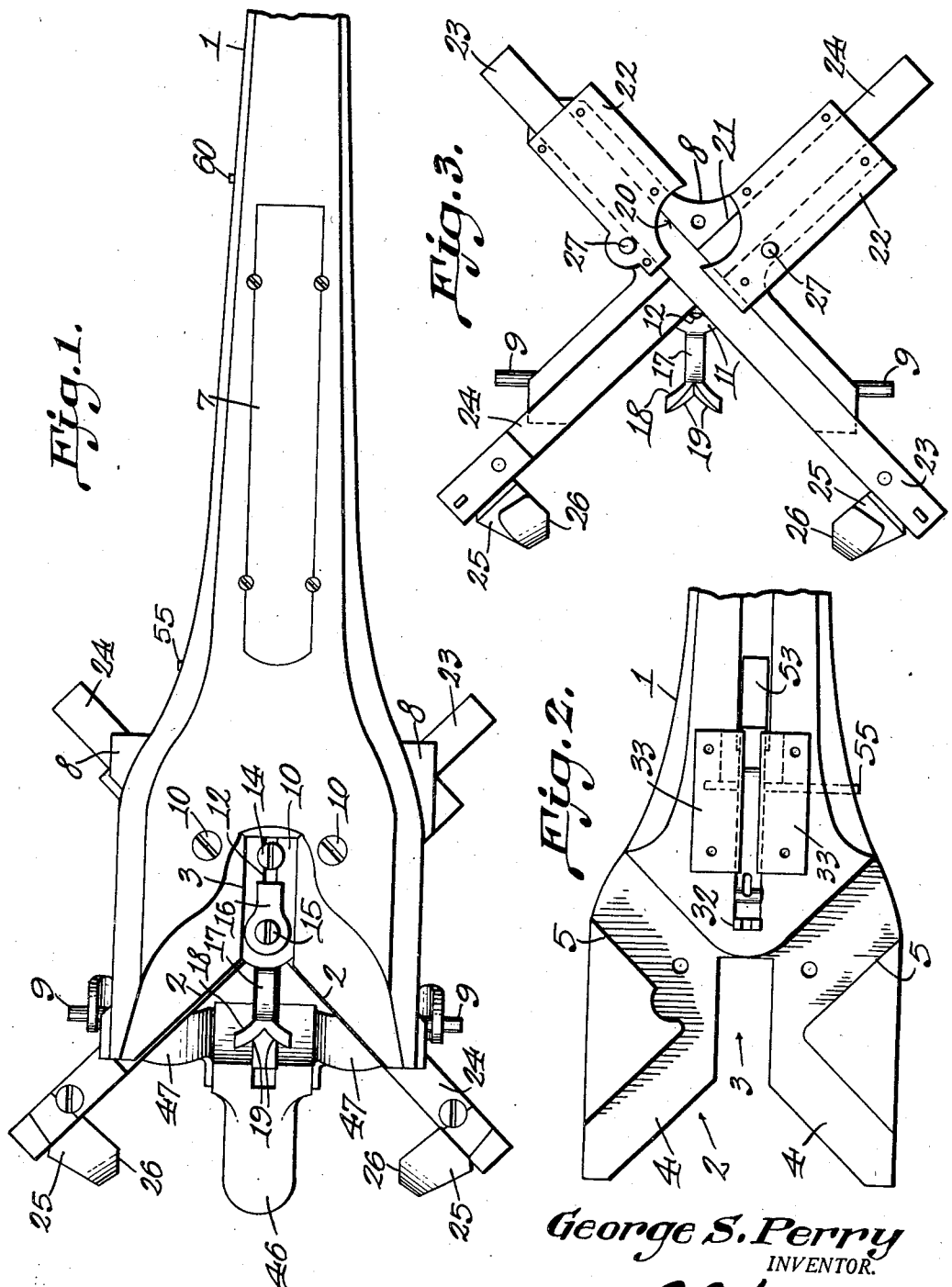
George S. Perry
INVENTOR.
BY
ATTORNEYS.

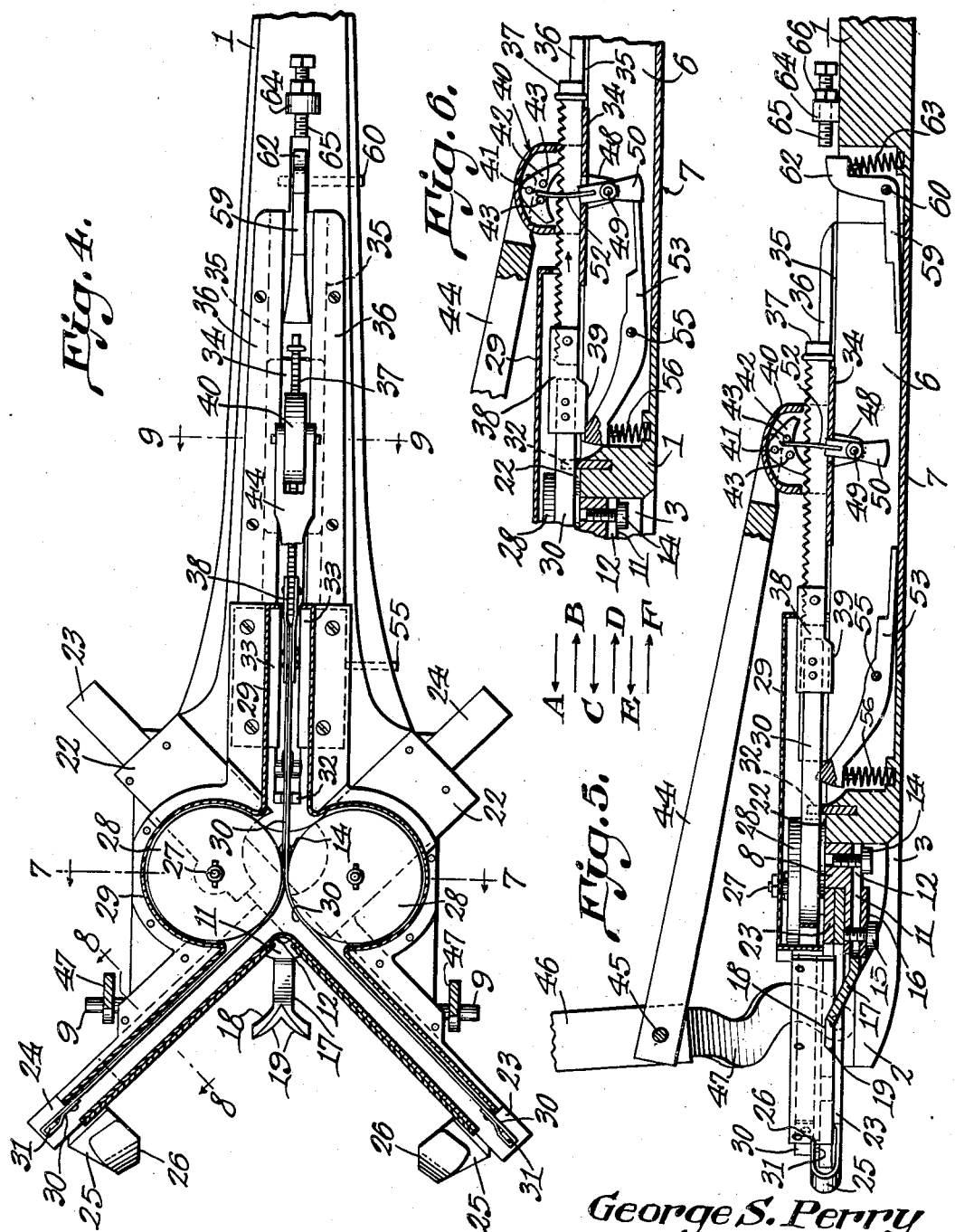

Jan. 9, 1940.  G. S. PERRY  2,186,654
TREE SCARRING DEVICE
Filed Oct. 28, 1938  3 Sheets-Sheet 3
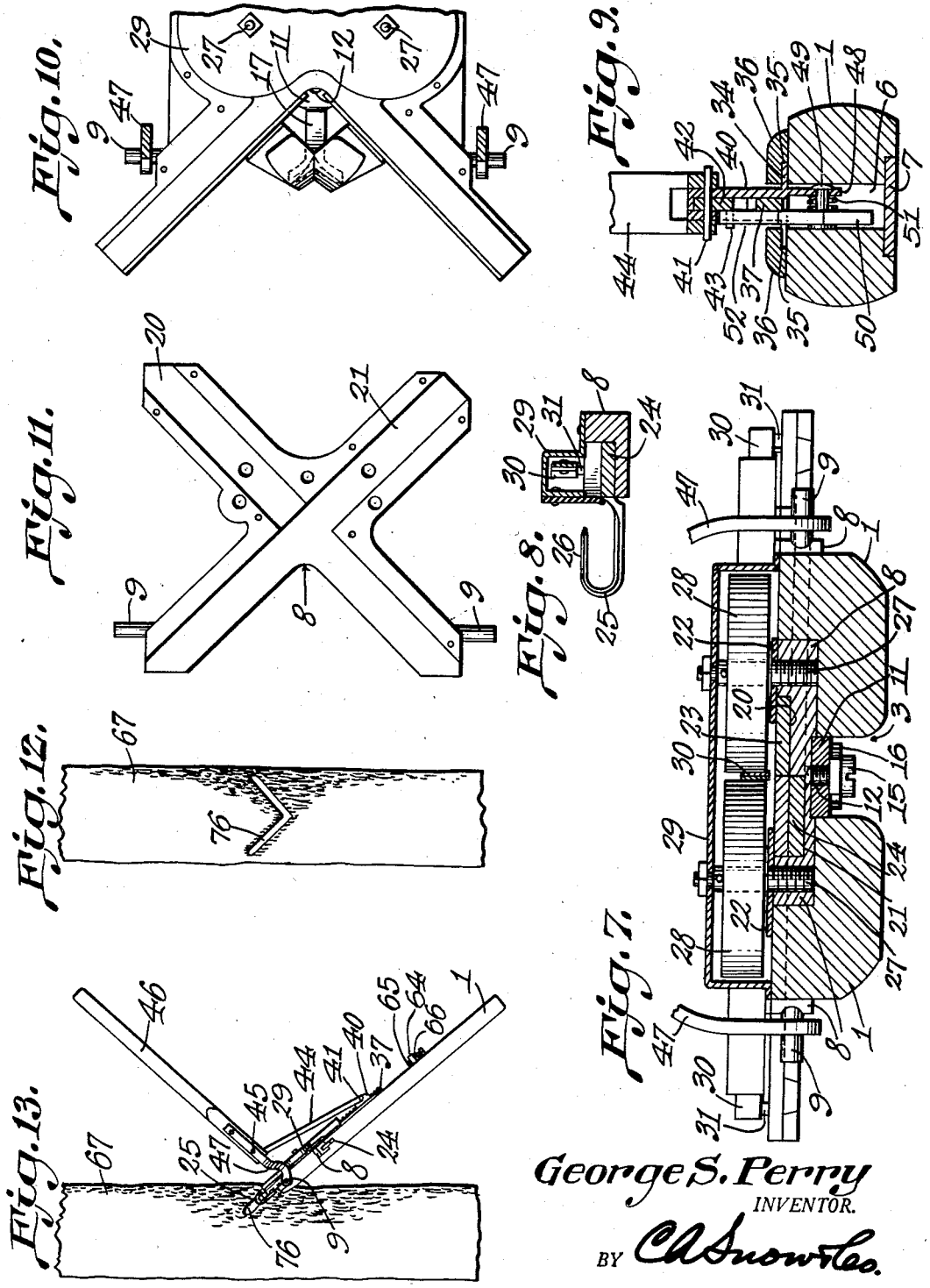
George S. Perry
INVENTOR.
BY C.A.Snow&Co.
ATTORNEYS.

Patented Jan. 9, 1940

2,186,654

UNITED STATES PATENT OFFICE 2,186,654

TREE SCARRING DEVICE

George Stamper Perry, Du Pont, Ga., assignor of one-half to Walter Williams, Du Pont, Ga.

Application October 28, 1938, Serial No. 237,538

5 Claims. (Cl. 30—121)

The device forming the subject matter of this application is adapted to be used for making V-shaped cuts or scars in pine trees, and the invention aims to provide a novel means whereby both branches of the V-shaped scar may be cut at once, the scar in the tree being uniformly fashioned, and a free flow of gum sap being secured. A further object of the invention is to provide novel means whereby the depth of the scar may be regulated, the pores of the tree being left open, devices in use at present tending to close some of the pores. Another object of the invention is to provide a novel reversing mechanism, whereby the cutters will be given a long stroke, with a minimum throw of the lever which actuates them.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows, in bottom plan, a device constructed in accordance with the invention, parts being broken away;

Fig. 2 is a top plan showing the forward part of the handle;

Fig. 3 is a top plan of the guide frame, with the cutters in place;

Fig. 4 is a top plan of the tool wherein parts are broken or sectioned away;

Fig. 5 is a longitudinal section, wherein parts are broken away;

Fig. 6 is a longitudinal section showing a portion of the reversing mechanism;

Fig. 7 is a section on the line 7—7 of Fig. 4;

Fig. 8 is a section on the line 8—8 of Fig. 4;

Fig. 9 is a section on the line 9—9 of Fig. 4;

Fig. 10 is a fragmental top plan of the forward end of the handle and associated parts, portions being broken away;

Fig. 11 is a plan of the guide frame;

Fig. 12 is an elevation showing the scar in the tree;

Fig. 13 is an elevation showing the device in use at the tree.

In carrying out the invention, there is provided a portable body or handle 1, of any desired length, having, in its forward end, a V-shaped notch 2, as shown in Fig. 2, the notch including a rearwardly prolonged, reduced extension 3. In the upper surface of the handle 1, there are rearwardly converging seats 4, opening inwardly into the notch 2, the seats forming parts of rearwardly diverging grooves 5. An elongated recess 6 (Fig. 5) is formed in the handle 1, to the rear of the extension 3 of the notch 2, the recess opening upwardly through the handle 1. Access is had to the recess 6, from the lower surface of the handle 1, by means of a removable closure 7, secured to the handle, as disclosed in Fig. 1.

The device comprises a cruciform frame 8 (Fig. 11), preferably made of metal. At its forward end, the frame 8 is supplied with outstanding stub shafts 9. The frame 8 is seated in the grooves 4—5 of the handle 1 (Fig. 2), and is held therein by securing elements 10 (Fig. 1).

A stop 11 (Figs. 7, 5 and 4) is located beneath the frame 8 and has an elongated slot 12 (Fig. 1), the stop being located in the extension 3 of the notch 2 of the handle 1, as Fig. 7 will make manifest. A securing element 14 (Fig. 5) such as a screw, connects the stop 11 to the frame 8, the securing element being located in the slot 12 of the stop. Another securing element, marked by the numeral 15, is similarly placed, and carries a washer 16, covering the slot 12 partially, as can be seen in Fig. 1. The stop 11 includes an upwardly inclined forward part 17 (Fig. 5) extended (Fig. 4) into the space between the diverging forward arms of the frame 8, the part 17 of the stop 11 terminating in a fork 18 having sharpened inner edges 19. For a purpose to be made manifest hereinafter, the stop 11 is capable of adjustment longitudinally of the handle 1, through the instrumentality of the securing elements 14 and 15 and the slot 12 of the stop.

The frame 8 is provided with guide grooves 20 and 21 (Fig. 11) arranged at right angles to each other, the guide grooves opening inwardly through the forward arms of the frame 8. It can be seen in Fig. 7 that the guide groove 20 is somewhat shallower than the guide groove 21. Retaining plates 22 (Figs. 3 and 4) are secured to the rearwardly diverging arms of the frame 8 and extend across the guide grooves 20 and 21.

A blade carrier 23 is mounted for longitudinal reciprocation in the guide groove 20 of the frame 8, and a blade carrier 24 is mounted for longitudinal reciprocation in the guide groove 21 of the said frame 1, the blade carrier 23 working over the top of the blade carrier 24, since the guide groove 21 is deeper than the guide groove 20. The blade carriers 23 and 24 reciprocate beneath the retaining plates 22 of Figs. 4 and 3. Inwardly projecting hook-shaped blades 25 (Figs. 4 and 8) are secured to the forward ends of the blade carriers 23 and 24, and have sharpened rear edges 26.

Shafts 27 (Fig. 7) are secured in the frame 8, and on the shafts, pulleys 28 are journaled. The pulleys 28 are disposed beneath a cover 29, secured to the fixed shafts 27 and to the handle 1, the cover extending over the guideways 21 and 20 of the frame 8. The forward ends of flexible elements, such as metallic tapes 30, are secured at 31 to the forward ends of the blade carriers 23 and 24, as can be seen in Fig. 4. The flexible elements 30 extend backwardly, about the pulleys 28. The flexible elements 30 slide edgewise in a notched guide 32 (Figs. 6 and 4) secured in the handle 1. The flexible elements 30 reciprocate between guiding ribs 33 (Fig. 2) on the handle 1, and in the back part of the cover 29 (Fig. 4). The elements 30, although flexible, are stiff enough to exert a thrust on the blade carriers 23 and 24.

A slide plate 34 (Fig. 5) is mounted to reciprocate in guideways 35, formed in the inner edges of ribs 36 (Fig. 4) secured to the handle 1. An upstanding housing 40 is secured to the slide plate 34.

The numeral 37 marks a rack bar joined to the rear ends of the flexible elements 30 by a connector 38, which may be considered as part of the rack bar, the connection having a depending shoulder 39. The rack bar 37 is supported on the slide plate 34 and passes through the housing 40, slidably. The housing 40 carries a pivot element 41, on which a double-ended dog 42 is mounted to swing, the dog being located within the housing 40 (Fig. 6). The dog 42 is supplied with lateral projections 43, located below and on opposite sides of the pivot element 41.

The pivot element 41 connects a link 44 to the housing 40, and, therefore to the rack bar 37 wherewith the dog 42 cooperates. The link 44, at its forward end, is pivoted at 45 to an operating lever 46 having diverging arms 47 mounted on the stub shafts 9 (Fig. 1) of the frame 8 that is secured to the handle 1, a fulcrum for the operating lever thus being provided.

The slide plate 34 has a depending ear 48 (Figs. 5, 6 and 9), in which is mounted a pivot element 49. A lever 50 of the first order is mounted to swing on the pivot element 49 and extends downwardly into the recess 6 of the handle 1. A compression spring 51 (Fig. 9) surrounds the pivot element 49 and, abutting against the ear 48 and against the lever 50, maintains the lever in frictional contact with the head of the pivot element 49. The lower end of a spring tongue 52 is secured in the upper end of the lever 50, and the spring tongue extends upwardly between the projections 43 on the dog 42.

A forward reversing lever 53 is located in the recess 6 of the handle 1. The forward reversing lever 53 is fulcrumed intermediate its ends on the handle 1, as shown at 55. The rear end of the lever 53 is carried downwardly into contact with the closure 7 on the handle 1, and the forward end of the lever is maintained in the path of the shoulder 39 on the connection 38 between the rack bar 37 and the flexible elements 30, by a compression spring 56, cooperating with the bottom portion of the handle 1 and with the forward end of the lever 53.

A rear reversing lever 59 is located in the recess 6 of the handle 1, and is fulcrumed intermediate its ends on the handle, as shown at 60. The lever 59 includes an upstanding portion 62. A compression spring 63, interposed between the part 62 of the lever 59, raises the rear end of the lever 59 and swings the forward end of the lever downwardly into contact with the closure 7 on the handle 1. There is an upstanding lug 64 on the handle 1, at the rear end of the recess 6, and into the lug 64 is threaded an adjustable abutment 65, held in place by a lock nut 66, the abutment 65 being adapted to cooperate with the upstanding portion 62 of the lever 59, under conditions which will be pointed out hereinafter.

The screws 14 and 15 of Fig. 5 are loosened and then tightened, to permit a longitudinal adjustment of the tree-engaging stop 11, the position of the stop regulating the depth of the V-shaped hack 76 that is made in the tree 67 of Fig. 12 by the blades 25 on the cutter carriers 23 and 24, when the blades are moved backward and toward the apex of the angle defined by the cutter carriers. The blades 25 are retracted to the end of their cutting stroke (Fig. 10), and they are advanced to the open position of Fig. 4, by a train of parts including the blade carriers 23 and 24, the flexible but thrustingly effective elements 30, the rack bar 37, the slide plate 34 and the housing 40, the dog 42, the link 44, and the lever 46, which is fulcrumed at 9 with respect to the handle 1. The same train of parts operates to move the blades 25 from the open position of Fig. 4 to the position of Fig. 10, thereby to form the hack 76 of Fig. 12, and to make both branches of the hack at once.

One object of the invention is to supply a means for producing a long and effective hack without having to make a long sweep with the lever 46.

Noting the strokes marked A, B, C, D, E and F in Fig. 5, on stroke A, the dog 42 carries the rack bar 37 to the left, but not far enough so that the shoulder 39 operates the forward reversing lever 53. On stroke B, the rack bar 37 remains at rest, the slide plate 34 moves to the right and the dog 42 gets a new hold on the rack bar 37. On stroke C, the dog 42 carries the rack bar 37 to the left until the shoulder 39 tilts the forward reversing lever 53 to reverse the dog 42 by way of the lever 50 and the tongue 52. On stroke D, the dog 42 carries the rack bar 37 to the right, but not far enough so that the end of the rack bar operates the rear reversing lever 59. On stroke E, the rack bar 37 remains at rest, the slide plate 34 moves to the left and the dog 42 takes a new hold on the rack bar. On stroke F, the dog 42 carries the rack bar 37 to the right until the end of the rack bar engages the part 62 of the rear reversing lever 59 and causes that lever to reverse the pawl 42 to the position of Fig. 5, by way of the lever 50 and the spring tongue 52.

In view of the foregoing, the blades 25 are moved inwardly toward each other by a plurality of strokes of the lever 46, and are moved outwardly and apart by a plurality of strokes. The adjusting screw 65 limits the movement of the part 62 of the rear reversing lever 59, and consequently the movement of the rack bar 37 to the right, and thereby the cutting edges of the blades 25 are prevented from becoming dulled by contact with each other.

What is claimed is:

1. In a tree-scarring device, a body, blade carriers mounted for reciprocation on the body, at an angle to each other, inwardly projecting blades on the carriers, means for reciprocating the carriers, to cause the blades to move toward and from the apex of the angle defined by the carriers, said means comprising flexible pull and push elements connected to the carriers, guiding parts for the flexible elements and mounted on the body, and mechanism carried by the body for actuating the push and pull elements.

2. In a tree-scarring device, a body, blade carriers mounted for reciprocation on the body, at an angle to each other, inwardly projecting blades on the carriers, a slide mounted to reciprocate on the body, means for operating the carriers, including a rack bar having longitudinal reciprocation with respect to the slide, a double-ended dog carried by the slide, and means actuated by the rack bar at the ends of its strokes to secure a reversal of the dog with respect to the rack bar.

3. A tree-scarring device constructed as set forth in claim 2, and wherein the last-specified means embodies a first lever mounted to swing on the slide and operatively connected to the dog, reversing levers fulcrumed on the body and having their outer ends disposed in the path of travel of the rack bar, whereby the rack bar will tilt the reversing levers and dispose their inner ends in the path of the first lever.

4. A tree-scarring device constructed as set forth in claim 2, and wherein the last-specified means embodies a first lever mounted to swing on the slide and operatively connected to the dog, front and rear reversing levers fulcrumed on the body and having their outer ends disposed in the path of travel of the rack bar, whereby the rack bar will tilt the reversing levers and dispose their inner ends in the path of the first lever, a stop, and means for mounting the stop for adjustment on the body, toward and from the rear reversing lever, thereby to limit the movement of the rear reversing lever when the rack bar engages it, and to terminate the movement of the rack bar before the blades have come into contact with each other.

5. In a tree-scarring device, a body, blade carriers mounted for reciprocation on the body, at an angle to each other, inwardly projecting blades on the carriers, means for reciprocating the carriers, to cause the blades to move toward and from the apex of the angle defined by the carriers, a tree-engaging abutment carried by the body and projecting into said angle to limit the depth of the cuts made by the blades, a stop engaging a part of the means for reciprocating the carriers, to prevent the blades from coming into contact with each other, and means for mounting the stop on the body for adjustment toward and away from said part.

GEORGE STAMPER PERRY.